3,573,331
EPOXIDES
James Alexander Brydon, Bloomfield, and Louis Joseph Colaianni, Waldwick, N.J., assignors to Givaudan Corporation, Clifton, N.J.
No Drawing. Continuation-in-part of application Ser. No. 426,669, Jan. 19, 1965. This application May 23, 1969, Ser. No. 827,432
Int. Cl. C07d 1/18
U.S. Cl. 260—348           1 Claim

ABSTRACT OF THE DISCLOSURE

Novel epoxidized linalyl esters which are useful perfumistic materials and a process for their production.

CROSS REFERENCE

This application is a continuation-in-part of our U.S. patent application Ser. No. 426,669 for Novel Epoxides filed Jan. 19, 1965, now abandoned.

BACKGROUND OF THE INVENTION

Epoxy linalyl acetate is a known compound (Naves, Jour. Am. Chem. Soc., vol. 69, pp. 1692–8, 1947) having a soft, sweet clean odor having no basic floral or woody character, which has been prepared previously by the epoxidation of the corresponding linalyl acetate under anhydrous conditions. The present invention relates to other epoxidized linalyl esters which have softer and sweeter odor characteristics than their corresponding known unepoxidized linalyl esters, and which also have entirely different perfumistic characteristics than the known epoxidized linalyl acetate, i.e. they have a woody and floral odor characteristic making them useful for compounding in colognes and perfumes in which the known compounds referred to above would be useless. The known linalyl acetate epoxide has been prepared previously by epoxidation of linalyl acetate with perphthalic acid. (Swern. Jour. A., Chem. Soc., vol. 69, pp. 1692–8, 1947; Chemical Abstracts, vol. 50, p. 10991b, 1956; Mousseron et al., Comp. Rendus, vol. 251, pp. 14–16, 1960) but as is clear from the references cited therein by Böhme, Organic Synthesis, vol. 20, p. 70, 1940 and Berichte, vol. 70, p. 379, 1937, these methods utilized the epoxidizing agent under anhydrous conditions. Greenspan U.S. Pat. 2,692,271 discloses epoxidation utilizing an aqueous solution of a peracid but only at elevated temperatures of 50 to 60° C. in order to avoid formation of a dihydroxy compound. Mueller U.S. Pat. 3,155,638 discloses epoxidation of an ethylenically unsaturated compound with a mixture of hydrogen peroxide and phthalic anhydride. While this reaction mixture contains a small amount of water present in the hydrogen peroxide it is essentially an anhydrous reaction and is, of course, hazardous because of the well-known explosive properties of the hydrogen peroxide.

The process of the present invention is based upon the discovery, entirely unexpected in view of the prior art discussed above, that excellent yields of novel epoxidized linalyl esters may be obtained at low reaction temperatures by utilizing perphthalic acid as the epoxidizing agent in the aqueous solvent medium in which it is formed from phthalic anhydride and sodium perborate. The economic advantage of being able to prepare these valuable compounds without dehydrating the perphthalic acid to carry out the epoxidation under anhydrous conditions will be appreciated by those skilled in the art.

SUMMARY OF THE INVENTION

This invention relates to a process for the preparation of unsaturated epoxides and to certain novel epoxides obtained thereby. More particularly, the invention relates to the epoxidation of aliphatic and aryl acid esters of 2,6-dimethyl-2,7-octadien-6-ol, hereinafter referred to as linalyl esters and to certain novel epoxides thereof. The novel epoxides of this invention are useful in perfumery, for example, as odorants in the compounding of perfumes and other scented compositions by virtue of their fine fragrances.

In contrast to prior art epoxidation methods employing perphthalic acid under anhydrous or essentially anhydrous conditions, it has now been found that the epoxides of linalyl esters can be obtained in a good yield by carrying out the reaction in an aqueous reaction medium. Thus, in one comprehensive embodiment, the invention provides a process for converting linalyl esters to the corresponding epoxides by treating the ester with an aqueous suspension of perphthalic acid.

The linalyl esters used as starting materials are known compounds prepared by methods known in the art. The process of this invention is particularly well-suited to plant production since it eliminates the need for organic solvents in the preparation and use of perphthalic acid as an epoxidizing agent. Thus, there is provided a process for the preparation of linalyl ester epoxides in a particularly facile manner in an aqueous, solvent, reaction medium. More particularly, the process of this invention comprises preparing a compound of the formula

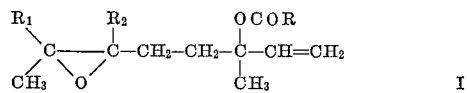
                                                                                                                                           I wherein R is H, lower alkyl or aryl, $R_1$ is lower alkyl and $R_2$ is hydrogen or methyl, by treating a compound of the formula

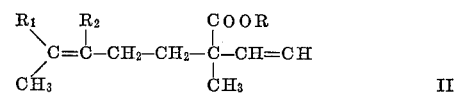
                                                                                                                                                                       II wherein R, $R_1$ and $R_2$ have the same significance as above with an aqueous preparation of perphthalic acid, containing sufficient water to act as an aqueous, solvent, reaction medium for the epoxidation reaction.

The term "lower alkyl" as used in this specification denotes both straight and branched chain hydrocarbons such as methyl, ethyl, propyl, butyl, isobutyl and the like. The term "aryl" denotes monocyclic aromatic hydrocarbons and substituted aromatics. The preferred aryl groups of this invention are the benzoic, caproic, salicylic, cinnamic and phenyl groups.

The preferred method of executing the process aspect of this invention comprises the following steps:

Preparing an aqueous solution of sodium perborate and phthalic anhydride; freeing perphthalic acid in the aqueous solvent reaction medium with a mineral acid or strong organic acid such as sulfuric acid, acetic acid and the like; adding an appropriate linalyl ester to the aqueous solvent perphthalic acid mixture and permitting the reaction to proceed in the aqueous solvent reaction medium; upon completion of the reaction, extracting the epoxide product from the aqueous reaction medium with an inert organic solvent such as toluene, benzene, hexane or pentane, ethers such as diethyl ether and the like; and, thereafter recovering the epoxide by known techniques such as by distillation.

The epoxidation reaction is preferably carried out at a low temperature. A preferred temperature range is from about 0° to about 10° C. though lower temperatures could also be utilized. Although the reaction is carried out in water as the primary reaction medium, there can also be added an inert organic solvent. Where an organic solvent is employed along with the water, it is preferred to use the same solvent which is employed for extracting the epoxide product from the reaction mixture, i.e., an inert organic solvent imiscible with water, such as toluene, benzene, hexane, diethyl ether and the like. The reaction begins immediately upon mixing the linalyl ester with the aqueous perphthalic mixture and is generally completed in about one hour. Reaction is facilitated by continuously stirring the aqueous solvent reaction medium. The reaction is exothermic and, therefore, it is desirable to cool the reaction mixture in order to maintain the preferred temperatures. Completion of the reaction can be observed by noting when the temperature stops rising or when all of the linalyl acetate has been consumed. For best yields of the epoxide product it is desirable to add the linalyl ester as rapidly as is practicable. Preferably the ester should be added in a single portion. When preparing the aqueous perphthalic acid mixture sufficient acid should be added to bring the pH of the mixture into the range of about 2.5 to about 3.5. Ordinarily, it is preferred to use a molar excess of perphthalic acid in carrying out the reaction. In order to obtain an excess of perphthalic acid, the sodium perborate and phthalic anhydride reagents are suitably employed in about 20 percent excess on a molar basis though greater or lesser amounts of either reagent may be used. While the reaction can be suitably carried out with any of the known linalyl esters, the process is particularly well adapted to the preparation of the novel linalyl ester epoxides of this invention. These novel linalyl ester epoxides, i.e., formate, butyrate, isobutyrate, cinnamate, caproate, benzoate and salicylate, along with the ethyl linalyl acetate esters constitute a preferred group which are particularly valuable because of their distinctive odor characteristics. They are specifically distinguishable and find different uses in the field of perfumery. The formate, isobutyrate and benzoate have been found to have especially valuable odor characteristics unlike those of any known compounds.

The invention is further disclosed in the following examples which are illustrative but not limitative thereof. Temperatures are stated in degrees Centigrade and all melting points have been corrected.

EXAMPLE 1

A 12 1. three-neck, round-bottom flask equipped with agitator and thermometer, containing 4500 cc. water was cooled to 0° C. with an external bath and 527 g. sodium perborate (3.42 moles) and 520 g. phthalic anhydride (3.54 moles) were added. Stirring was continued for 2 hours at 0° C. Then 250 cc. aqueous sulfuric acid 30 percent w./w. and 500 g. ice were added. Then 517 g. linalyl acetate (2.63 moles) was added rapidly while cooling with an external ice bath to keep the temperature below +10° C. Stirring was continued for 1 hour. The contents of the flask were transferred to a large agitated separating funnel and solid sodium carbonate was added until the pH of the solution was alkaline. 300 cc. of toluene was added and the water layer extracted. The water layer was separated and extracted with 2× 200 cc. of toluene. The toluene layers were combined and washed with 2× 100 cc. of 10 percent salt water. The toluene fractions were concentrated and distilled to give 3 - acetoxy-3,7-dimethyl-6,7-epoxy-1-octene (linalyl acetate epoxide).

EXAMPLE 2

A 5 liter, three-neck flask with agitator and thermometer containing 2500 cc. of water was cooled to 0° C. with a Dry Ice bath and 527 gm. of sodium perborate and 535 gm. of phthalic anhydride were added. The mixture was stirred at 0° C. for three hours.

The aqueous sulfuric acid (30 percent) was added until the mixture became strongly acid. 1 Liter of ether was added to the aqueous acid solution and the mixture stirred for one hour at 0° C. To the stirring acid mixture there was added 517 gm. of linalyl acetate (1.96 moles) and stirring was continued for one hour without cooling.

The entire aqueous mixture was transferred to a large open separatory funnel containing 2.5 liters of water. Sufficient sodium carbonate monohydrate powder was added to bring the mixture to alkaline pH. The water and ether were separated. The water layer was extracted with 3× 200 cc. of ether. The ether layers were combined and washed with 100 cc. of sodium thiosulfate solution 1 percent and washed neutral with 2× 100 cc. of salt water (ten percent). The ether solution was concentrated and distilled under vacuum to give 3-acetoxy-3,7-dimethyl-6,7-epoxy-1-octene (linalyl acetate epoxide). This procedure can also be employed to produce the corresponding compounds in which R is ethyl, propyl, caproic, salicylic, cinnamic or phenyl, by use of corresponding linalyl ester starting materials.

EXAMPLE 3

The procedure of Example 2 was repeated using ethyl linalyl acetate (the compound of Formula II wherein $R_1$ is ethyl (as the linalyl ester starting material to obtain the following compound.

3-acetoxy-3,7-dimethyl-6,7-epoxy-1-nonene

B.P.: 86° C. at 0.5 mm. $n_D^{25}$—1.4483.

Microanalysis—
  Calculated: C, 68.99%; H, 9.80%
  Found: C, 68.82%; H, 9.98%

Odor: soft, sweet, clean odor useful to supply naturalness in lavender-lavandin-bergamot where it supplies dry straw, woody dry-out.

This procedure may also be employed to produce compounds in which $R_1$ is n-propyl, isopropyl, butyl or other lower alkyl group or, in which $R_2$ is methyl by employing the corresponding linalyl ester starting materials.

EXAMPLE 4

The procedure of Example 2 was repeated using linalyl formate as the linalyl ester starting material to obtain the following compound.

6,7-epoxy-3-formoxy-3,7-dimethyl-1-octene

B.P.: 66° C. at 0.3 mm. $n_D^{25}$—1.4486.

EXAMPLE 5

The procedure of Example 2 was repeated using linalyl isobutyrate as the linalyl ester starting material to obtain the following compound.

6,7-epoxy-3-isobutyroxy-3,7-dimethyl-1-octene

B.P.: 86° C. at 0.8 mm. $n_D^{25}$—1.4406.

Microanalysis—
  Calculated: C, 69.96%; H, 10.07%
  Found: C, 69.83%; H, 10.23%

Odor: soft, sweet, floral odor which would blend well with amber leather cologne.

EXAMPLE 6

The procedure of Example 2 was repated using linalyl isovalerate as the linalyl ester starting material to obtain the following compound.

6,7-epoxy-3-isovaleroxy-3,7-dimethyl-1-octene

B.P.: 104° C. at 1.0 mm. $n_D^{25}$—1.443.

Microanalysis—
  Calculated: C, 70.89%; H, 10.30%
  Found: C, 70.60%; H, 10.41%

Odor: soft sweet odor possessing a slight apple fruitness with a definite sweety character necessary to reconstitute natural odor.

EXAMPLE 7

The procedure of Example 2 was repeated linalyl benzoate as the linalyl ester to obtain the following compound.

6,7-epoxy-3-benzoyloxy-3,7-dimethyl-1-octene

B.P.: 137° C. at 0.2 mm. $n_D^{25}$—1.5040.

Microanalysis—
Calculated: C, 74.42%; H, 8.08%
Found: C, 74.68%; H, 7.73%

Odor: soft, delicate and pleasant odor with amber-like undertone, slightly woody. Will blend well with modern orientals and fantasy types of odors to give desirable modern fragrances.

The representative specific examples given above are supplied by way of illustration of the method and novel epoxidized linalyl esters of the present invention and are not to be construed by way of limitation of the scope of the invention, since other compounds within the scope of Formula I above having the desired novel odor characteristics can be prepared similarly.

What is claimed is:
1. 6,7-epoxy-3-isovaleroxy-3,7-dimethyl-1-octene.

References Cited

UNITED STATES PATENTS

| 2,571,208 | 10/1951 | Craig | 260—348.5 |
| 2,692,271 | 10/1954 | Greenspan et al. | 260—348.5 |
| 2,736,730 | 2/1956 | Kleiman | 260—348.5X |
| 3,155,638 | 11/1964 | Mueller et al. | 260—348.5X |

OTHER REFERENCES

Chemical Abstracts, vol. 50 (1956), p. 10991b.
Swern, D., Jour. Am. Chem. Soc., vol. 69, pp. 1692–8 (1947).
Naves, Y. R. Helv. Chim. Acta., vol. 28 (1945), pp. 1231–1233.
Chemical Abstracts, vol. 59, p. 665.
Drug and Cosmetic Industry, vol. 91 (1962), pp. 427–8, 486, 488, 490, 492, 494.
Janistyn, Hugo: Riechstoffe Seifen K/osmetika, vol. 1 (1950), p. 642.
Maurer, E. S.: Perfumes and their Production (1958), pp. 85, 97–8, 117, 125, 131.
The Givaudan Index, 2nd. ed. (1961), pp. 221, 222, 223–227.

NORMA S. MILESTONE, Primary Examiner

U.S. Cl. X.R.
260—348.5; 252—522